US008442485B2

(12) United States Patent
Chowdhury et al.

(10) Patent No.: US 8,442,485 B2
(45) Date of Patent: May 14, 2013

(54) SYSTEM AND METHOD FOR MEASURING AND REPORTING SERVICE USAGE (75) Inventors: Kuntal Chowdhury, Plano, TX (US); Shaji E. Radhakrishnan, Nashua, NH (US)

(73) Assignee: Cisco Technology, Inc., San Jose, CA (US)

(*) Notice: Subject to any disclaimer, the term of this patent is extended or adjusted under 35 U.S.C. 154(b) by 1781 days.

(21) Appl. No.: 11/455,325

(22) Filed: Jun. 19, 2006

(65) Prior Publication Data

US 2007/0291678 A1 Dec. 20, 2007

(51) Int. Cl.
*H04M 11/00* (2006.01)
*H04W 4/00* (2009.01)
*H04B 7/216* (2006.01)
*H04M 15/00* (2006.01)

(52) U.S. Cl.
USPC ...... 455/406; 370/328; 370/342; 379/114.01; 379/114.02; 379/114.03

(58) Field of Classification Search .................. 370/342
See application file for complete search history.

(56) References Cited

U.S. PATENT DOCUMENTS

| 6,161,008 | A | 12/2000 | Lee et al. |
| 6,618,355 | B1 | 9/2003 | Gulliford et al. |
| 7,272,379 | B1* | 9/2007 | Tang et al. ............ 455/406 |
| 7,640,015 | B2* | 12/2009 | Connelly et al. ............ 455/423 |
| 2002/0068545 | A1 | 6/2002 | Oyama et al. |
| 2002/0116338 | A1 | 8/2002 | Gonthier et al. |
| 2002/0128984 | A1 | 9/2002 | Mehta et al. |
| 2002/0131404 | A1 | 9/2002 | Mehta et al. |
| 2002/0133457 | A1 | 9/2002 | Gerlach et al. |
| 2002/0174212 | A1 | 11/2002 | Casati et al. |
| 2002/0177429 | A1 | 11/2002 | Watler et al. |
| 2002/0193093 | A1 | 12/2002 | Henrikson et al. |
| 2003/0014361 | A1 | 1/2003 | Klatt et al. |
| 2003/0014367 | A1 | 1/2003 | Tubinis |
| 2003/0027554 | A1 | 2/2003 | Haumont |
| 2003/0031160 | A1 | 2/2003 | Gibson et al. |

(Continued)

FOREIGN PATENT DOCUMENTS

| JP | 2003-101678 A | 4/2003 |
| WO | WO-2004/051978 A2 | 6/2004 |
| WO | WO-2004/071011 A1 | 8/2004 |
| WO | WO-2005002135 A1 | 1/2005 |

OTHER PUBLICATIONS

International Search Report and Written Opinion issued for corresponding International Patent Application No. PCT/US2007/014243.

(Continued)

*Primary Examiner* — Huy C Ho
(74) *Attorney, Agent, or Firm* — Wilmer Cutler Pickering Hale and Dorr LLP (57) ABSTRACT Systems and methods for measuring and reporting prepaid service usage are provided. More particularly, monitoring and reporting packet data session usage for purposes of charging for service usage are provided. In some embodiments, layer-3 data packet monitoring is used to determine usage. In other embodiments, the start and end of a packet data session are used to determine usage. The usage can be determined from the duration of the packet data session or from the size or amount of packets sent and received by a mobile node.

23 Claims, 4 Drawing Sheets

U.S. PATENT DOCUMENTS

| | | |
|---|---|---|
| 2003/0043985 A1 | 3/2003 | Wu |
| 2003/0046231 A1 | 3/2003 | Wu |
| 2003/0055735 A1 | 3/2003 | Cameron et al. |
| 2003/0078031 A1 | 4/2003 | Masuda |
| 2003/0088511 A1 | 5/2003 | Karboulouis et al. |
| 2003/0095555 A1 | 5/2003 | McNamara et al. |
| 2003/0120499 A1 | 6/2003 | MacLean et al. |
| 2003/0165222 A1 | 9/2003 | Syrjala et al. |
| 2003/0233580 A1 | 12/2003 | Keeler et al. |
| 2004/0008672 A1 | 1/2004 | Kobylarz et al. |
| 2004/0017905 A1 | 1/2004 | Warrier et al. |
| 2004/0018829 A1 | 1/2004 | Raman et al. |
| 2004/0019539 A1 | 1/2004 | Raman et al. |
| 2004/0058669 A1* | 3/2004 | Carmon et al. ............... 455/406 |
| 2004/0106393 A1* | 6/2004 | Chowdhury et al. ......... 455/406 |
| 2004/0186850 A1 | 9/2004 | Chowdhury et al. |
| 2005/0078808 A1 | 4/2005 | Winstead et al. |
| 2005/0195743 A1 | 9/2005 | Rochberger et al. |
| 2005/0259679 A1 | 11/2005 | Chowdhury et al. |
| 2006/0276170 A1 | 12/2006 | Radhakrishnan et al. |
| 2007/0091874 A1 | 4/2007 | Rockel et al. |
| 2007/0214083 A1 | 9/2007 | Jones et al. |
| 2007/0244965 A1 | 10/2007 | Dowling |
| 2007/0253371 A1 | 11/2007 | Harper et al. |
| 2007/0254661 A1 | 11/2007 | Chowdhury et al. |

OTHER PUBLICATIONS

"cdma2000 Wireless IP Network Standard: Accounting Services and 3GPP2 Radius VSAa," 3rd Generation Partnership Project 2 "3GPP2", 3GPP2 X.S0011-005-C, Version 1.0.0, Aug. 2003.

"cdma2000 Wireless IP Network Standard: PrePaid Packet Data Service," 3rd Generation Partnership Project 2 "3GPP2," 3GPP2 X.S0011-006-C, Version: 1.0.0, Aug. 2003.

3GPP2 X.S0011-005-C. Version 3.0. 3rd Generation Partnership Project 2 "3GPP2." "cdma2000 Wireless IP Netowork Standard; Accounting Services and 3GPP2 Radius VSAs." Oct. 2006. 49 pages.

* cited by examiner

SYSTEM AND METHOD FOR MEASURING AND REPORTING SERVICE USAGE

BACKGROUND OF THE INVENTION

The present invention relates to measuring and reporting network service usage. More particularly, this invention relates to determining packet data session usage for the purposes of charging an account.

While cellular wireless communication systems were originally designed to transmit voice communications, increasingly these networks have been modified to also support data communications, such as packet based data communications. With the advent of Internet Protocol (IP), networks began sending data in packets and using IP addresses to route the data to its final destination. In time, wireless networks started to become data capable and would assign an IP address to a mobile node for the purpose of sending data to the mobile node. Packet data communications allow users to retrieve various types of content such as email, movies, websites, and files as well as voice communications.

Generally, interconnection between devices is standardized to a certain degree based on the International Organization for Standardization's definition of a model for Open Systems Interconnection (OSI). OSI uses a seven layer model to define modes of interconnection between different components in networking systems. Among the seven layers, layer-3 (L3) is the network layer that is concerned with the delivery of packets of data. This layer defines the address structure of the network and how packets should be routed between end systems. IP, Mobile IP (MIP), and Internet Packet Exchange (IPX) are examples of network layer protocols. Users can use mobile nodes, such as a cell phone, to access various types of content with packet data. However, a problem emerges on how to charge a user for the use of the packet data communications. With voice communications, this is typically measured by the duration of the call from initiation of the voice call to the termination of the call because the user would have a dedicated line on which to speak. For packet data communications resources may be used only when packets are being transmitted. Thus, a couple of charging methods can be used such as charging by the volume of data used, by assessing a flat recurring fee (e.g., on a monthly basis), or by the duration the service is used (e.g., time user is connected). It would, therefore, be desirable to measure packet data communications for service used for the purposes of charging a user.

SUMMARY OF THE INVENTION

Systems and methods for measuring and reporting service usage are provided. More particularly, monitoring and reporting packet data session usage for purposes of charging for network service usage are provided.

In accordance with the present invention, certain embodiments feature a process for measuring and charging for service usage from layer-3 packets including monitoring layer-3 packets for a packet data session to start, recording a first timestamp from a packet when the packet data session starts, monitoring layer-3 packets sent or received by a mobile node, recording a second timestamp from a packet sent or received by the mobile node, and reporting to a PrePaid server the packet data session duration from the first timestamp to the second timestamp.

Further in accordance with the present invention, certain embodiments feature a process for measuring and charging for service usage from layer-3 packets including monitoring layer-3 packets for a packet data session to start and for data packets sent and received by a mobile node, recording information from data packets sent and received by the mobile node, and reporting to a PrePaid server information about the packet data session.

Still further in accordance with the present invention, certain embodiments feature a system for measuring and charging for service usage from layer-3 packets including a mobile node, a PrePaid Client, an Authentication, Authorization, and Accounting (AAA) server, and a PrePaid Server. The PrePaid Client coupled to the mobile node that records at least one timestamp to determine usage from layer-3 data packets sent or received by the mobile node during a packet data session. The AAA server in communication with the PrePaid Client that authenticates the mobile node and authorizes the packet data session, and the PrePaid Server in communication with the AAA server that stores account information.

Yet further in accordance with the present invention, certain embodiments feature a process for measuring and charging for service usage including recording a first timestamp in a PrePaid Client when a packet data session starts with a mobile node, recording a current timestamp in the PrePaid Client when a packet data session ends with the mobile node, reporting the duration from the first timestamp to the current timestamp to a PrePaid server.

Still further in accordance with the present invention, certain embodiments feature a process measuring and charging for service usage in the event of a network device failure including monitoring radio link transmission times of data packets sent or received by a mobile node at the network device, sending at least one update from the PrePaid Client to the PrePaid Server regarding a duration usage by the mobile node, and reporting a last reported duration to the PrePaid server when a packet data session timer expires.

BRIEF DESCRIPTION OF THE DRAWINGS

The above and other advantages of the present invention will be apparent upon consideration of the following detailed description, taken in conjunction with the accompanying drawings, in which like reference characters refer to like parts throughout, and in which.

DETAILED DESCRIPTION OF THE INVENTION

In accordance with the present invention, systems and methods for determining usage during a packet data session for the purposes of charging a user are presented. The user is charged based on the use of the service in fulfilling the user's request. The present invention describes and defines systems and methods to report the duration or volume of packet data communication sessions to charge a user's account.

Figure 1:
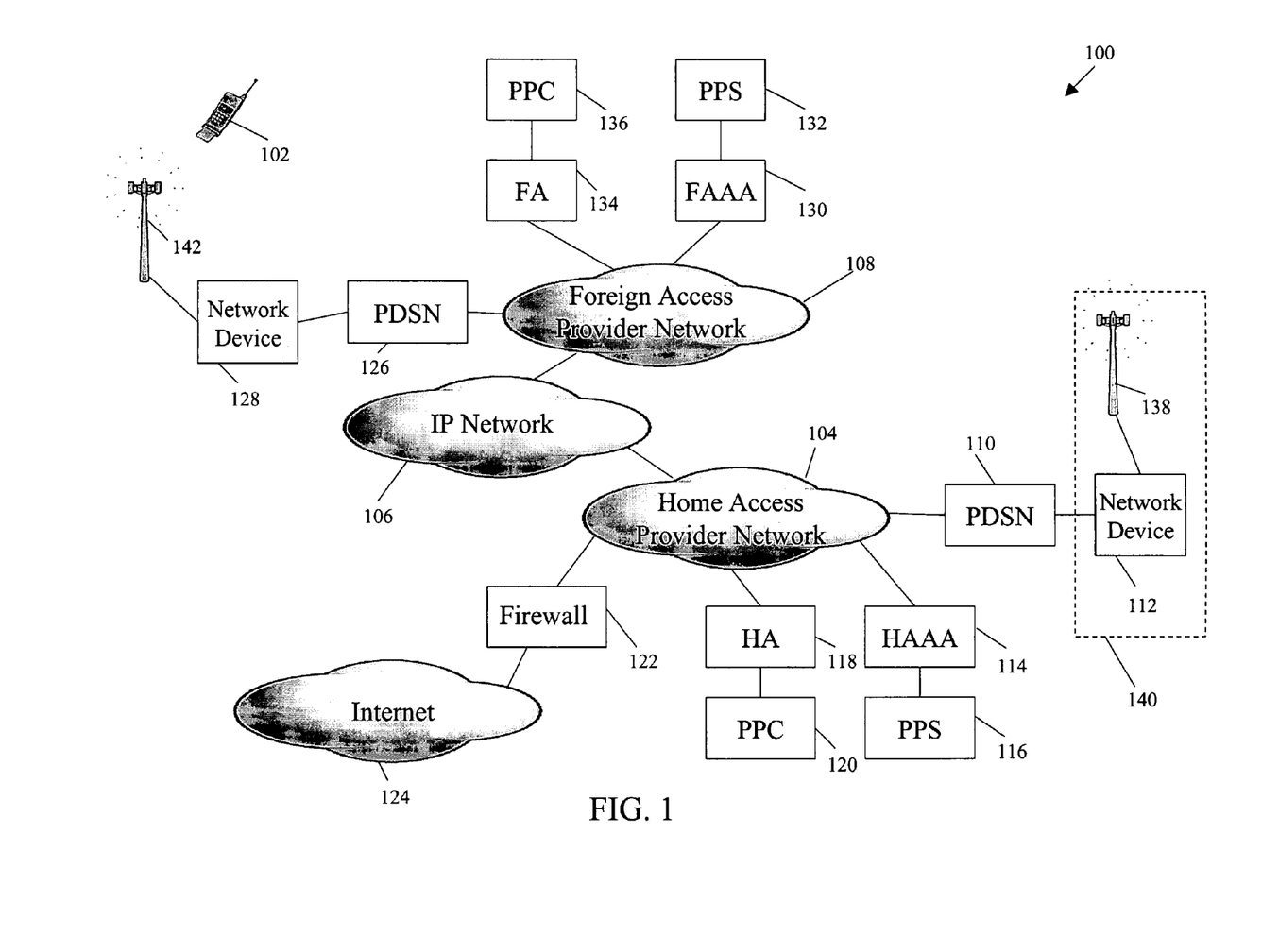
FIG. 1 is a schematic diagram of a network topology used for packet data transmissions in accordance with certain embodiments of the present invention.

FIG. 1 illustrates a functional representation of a packet data communication network 100 that supports wireless data communication to mobile nodes, such as mobile node 102.

Data communication network 100 includes a Home Access Provider Network 104, an Internet Protocol (IP) Network 106, and a Foreign Access Provider Network 108. Home Access Provider Network 104 includes a packet data serving node (PDSN) 110, a network device 112 (which may be at least one of Packet Control Function (PCF), a Base Station Controller (BSC) or a Radio Network Controller (RNC)), a Home Authentication, Authorization, and Accounting (HAAA) server 114, a PrePaid Server (PPS) 116, a Home Agent (HA) 118, and a PrePaid Client (PPC) 120. Internet access may also be provided through Home Access Provider Network 104 through firewall 122 to Internet 124. Home Access Provider Network 104 is coupled to Foreign Access Provider Network 108 through IP Network 106.

As shown, Foreign Access Provider Network 108 includes a PDSN 126, a network device 128 (which may be a PCF, BSC or a RNC), a Foreign Authentication, Authorization, and Accounting (FAAA) server 130, a PrePaid Server (PPS) 132, a Foreign Agent (FA) 134, and a PrePaid Client (PPC) 136. The Foreign Access Provider Network can be a network infrastructure of the same access provider as the Home Access Provider Network or can be a different access provider. Further, depending on the location of mobile node 102, the mobile node may receive service from the Home Access Provider Network or the Foreign Access Provider Network. As such, Foreign Access Provider Network 108 includes many of the same network devices as Home Access Provider Network 104 and this is indicated by the similarities in the names of the network devices. The network devices listed in both the Foreign and Home Access Provider Networks may actually be implemented using different hardware and software, but will generally provide similar functionality. As one practiced in the art would appreciate, more than one of the above-named devices in the Foreign and Home Access Provider Networks can be used to provide redundancy and/or to improve service coverage. Additionally, because packet data communication network 100 is a functional representation, the functions shown may be implemented by co-locating one or more of the functions in a device. For example, PDSN 126, Foreign Agent 134, and PrePaid Client 136 can be implemented in a PDSN, with the different functionalities in communication with one another.

As illustrated, Home Access Provider Network 104 provides an interconnection among many of the devices that service a mobile node. Network device 112 provides flow control for the packet data being transmitted to a mobile node in range of a base station 138 coupled to network device 112. The combination of network device 112 and base station 138 along with possibly other components not shown may be considered a radio access network (RAN) 140. PDSN 110 is coupled to network device 112. PDSN 110 is a network access server or router through which mobile nodes connect to a packet data network such as IP Network 106. IP Network 106 may be the Internet, a Local Area Network (LAN), a Wide Area Network (WAN), or any other suitable network. Home Access Provider Network 104 further includes Home Agent 118, which provides the mobility management functions used for IP communications on behalf of the mobile node. The Home Agent can be a router that maintains the identity of mobile nodes (e.g., IP address), tunnels data packets for delivery to mobile nodes that are roaming outside the Home Access Provider Network, and maintains current location information for the mobile nodes.

In addition to Home Agent 118, HAAA server 114 interacts with a mobile node to process requests for access to network resources. HAAA server 114 authenticates subscribers attempting to access the network by comparing the subscriber's credentials (e.g., at least one of Network Access Identifier (NAI), username, password, and/or handset serial number) with credentials stored in the HAAA server. For subscribers that gain access to the network, HAAA server 114 determines and delivers a selected or predetermined level of service by authorizing the user to access certain network resources such as sending connection information to other devices on the network and setting restrictions such as data bandwidth, session duration, and session timeout lengths. HAAA server 114 can also record subscribers' network access activity for the purpose of billing or crediting a prepaid account. When dealing with prepaid account information, PrePaid Server 116 may be used in conjunction with HAAA server 114. In some embodiments, HAAA server 114 implements a Remote Authentication Dail-In User Service (RADIUS) functionality for Authentication, Authorization, and Accounting (AAA) communication.

Along with PrePaid Servers 116 and 132, PrePaid Clients 120 and 136 fulfill a client-server relationship where PrePaid Client 136 requests prepaid packet data services on behalf of a mobile node 102, and PrePaid Server 116 controls prepaid packet data services provided to mobile node 102. PrePaid Servers 116 and 132 and PrePaid Clients 120 and 136 may be implemented in hardware, software, firmware, or in any other suitable fashion. Additionally in some embodiments, PrePaid Clients 120 and 136 may be implemented in a network device, a PDSN, or HA/FA, while PrePaid Servers 116 and 132 can be implemented in a HAAA/FAAA servers 114 and 130.

Regardless of how a PrePaid server is implemented, generally a subscriber desiring to utilize a prepaid packet data service first establishes an account balance on the PrePaid server of the subscriber's Home Access Provider Network 104. The subscriber may purchase the account balance, for example, by purchasing a data card and entering in an account authorization number displayed on the card into mobile node 102 at the onset of the first data session. Upon entering the authorization information, mobile node 102 can send this information to PrePaid server 116 to either establish or refresh the subcriber's quota. Alternatively, the subscriber could purchase the prepaid service through a secure website, which upon authenticating the payment interacts with PrePaid server 116 to refresh the quota, or by providing payment information to an operator who can adjust the quota on PrePaid server 116. In other embodiments, the subscriber can pay a flat fee per month or periodically recharge the account. Thereafter, when PrePaid server 116 receives a request for prepaid packet data services from PrePaid client 120, PrePaid server 116, after AAA operations by HAAA 114, allocates a quota based on the account balance to PrePaid client 120.

Generally, the subscriber of mobile node 102 can subscribe to at least two levels of packet data service provided by Home Access Provider Network 104, namely Simple IP and Mobile IP. Simple IP can provide a level of IP address mobility that allows the mobile node to retain the same IP address while roaming among base stations 138 or 142 and serviced by PDSN 110 or 126. Alternatively, Mobile IP maintains the same IP address for mobile node 102 for the duration of a session even if mobile node 102 roams among base stations supported by different PDSNs/FAs. In Mobile IP, a link or tunnel is setup between the FA and the HA across IP Network 106 to carry data and mobile node 102 is assign an IP address that is maintained by HA 118. If the mobile node 102 roams to another PDSN, the associated FA can establish and new tunnel and obtain the IP address from the HA.

Figure 2:
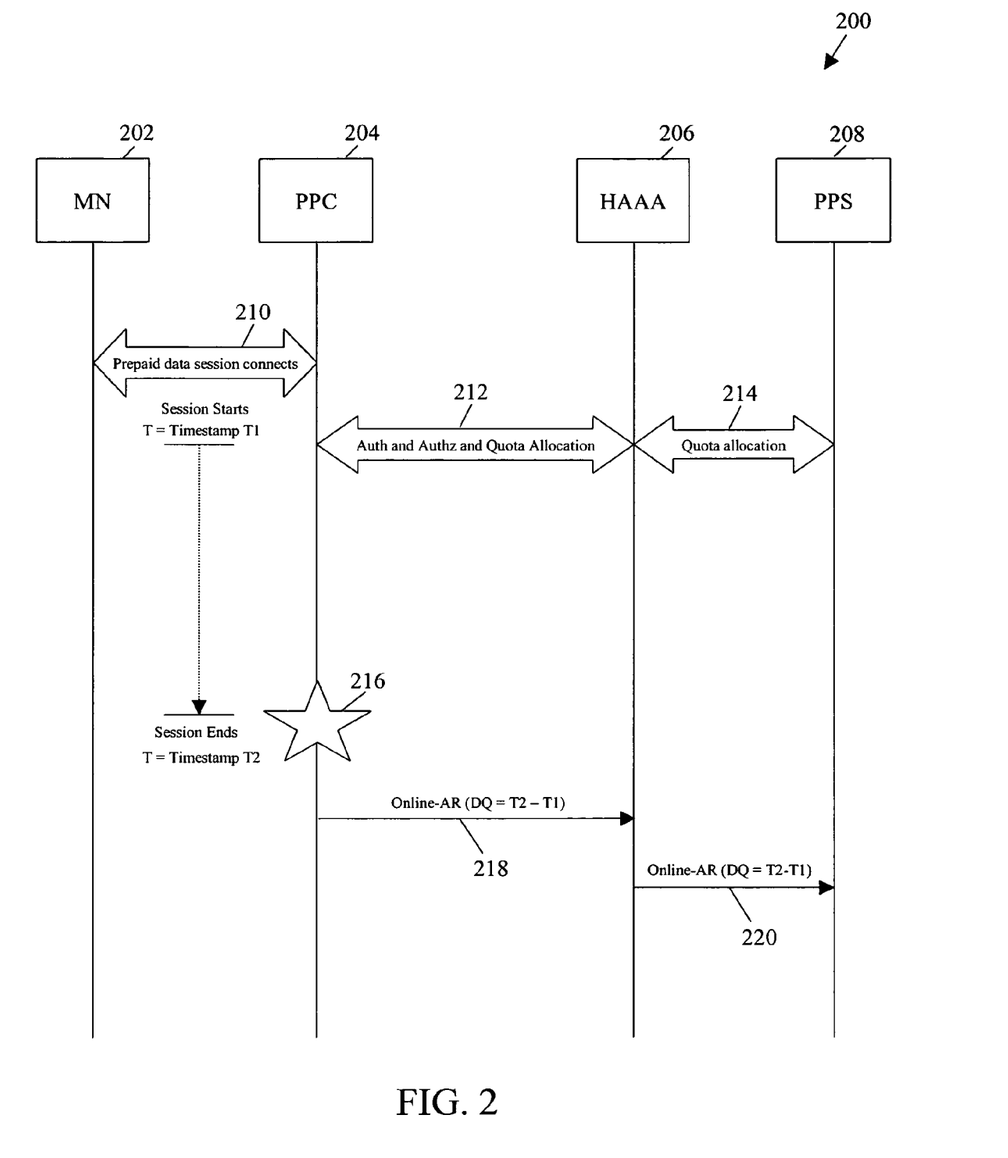
FIG. 2 is a schematic diagram of a process for determining usage until the end of a session in accordance with certain embodiments of the present invention.

FIG. 2 illustrates a process 200 for reporting usage until the end of a session in accordance with certain embodiments of the present invention. In process 200, a mobile node 202, a PrePaid Client 204, a HAAA 206, and a PrePaid Server 208 interact to provide each other with information to compute the duration of a packet data session. At step 210, mobile node 202 contacts PrePaid Client 204 to initiate a packet data session. PrePaid Client 204 contacts HAAA 206 to authenticate and authorize mobile node 202 and to retrieve a quota allocation associated with mobile node 202 in step 212. HAAA 206 contacts PrePaid Server 208 to lookup the quota allocation associated with mobile node 202 in step 214. As a result of steps 212 and 214, a packet data session starts and mobile node 202 can begin sending and receiving packet data to and from network 100 (FIG. 1). The start of the packet data session is marked by a timestamp which is denoted T1 in FIG. 2. This timestamp can be stored along with other session information in PrePaid Client 204, a PDSN (not shown) or a Home Agent (not shown). Further, PrePaid Client 204 can be implemented on a PDSN, a Home Agent, or a Foreign Agent.

At some point in time, the packet data session is terminated by either mobile node 202 or by another device in the network at step 216. The packet data session may be ended by another device in the network because of a network failure or because of a timeout which occurs after a predetermined amount of inactivity occurs. With the termination of the packet data session, a timestamp denoted T2 in FIG. 2 is recorded. Timestamp T2 is the current time taken when the packet data session ends. In some embodiments, a timestamp is recorded for each packet sent and received by mobile node 202, and when the packet data session ends, the last timestamp sent or received (timestamp T2) is retrieved. This timestamp recording may be done in a buffer where the timestamp is overwritten with each new timestamp. To determine an amount that should be deducted from the quota allocation of the user, timestamp T2 is subtracted from timestamp T1. The difference in the timestamps T1 and T2 reflects the time at which the user was connected in the PDSN or HA (not shown) and may not account for whether the user was actively using the data connection. In step 218, PrePaid Client 204 sends an online account report (AR) to HAAA 206. HAAA 206 sends the online account reporting to PrePaid Server 208 which can record the duration quota (DQ) against the user's quota allocation in step 220. In some embodiments, PrePaid Server 208 is sent timestamp T1 when the packet data session starts and the timestamp is compared against current time to monitor if the packet data session should be terminated due to lack of available quota. The timestamp quota calculation may also be performed in the PrePaid Server in certain embodiments of the invention.

Figure 3:
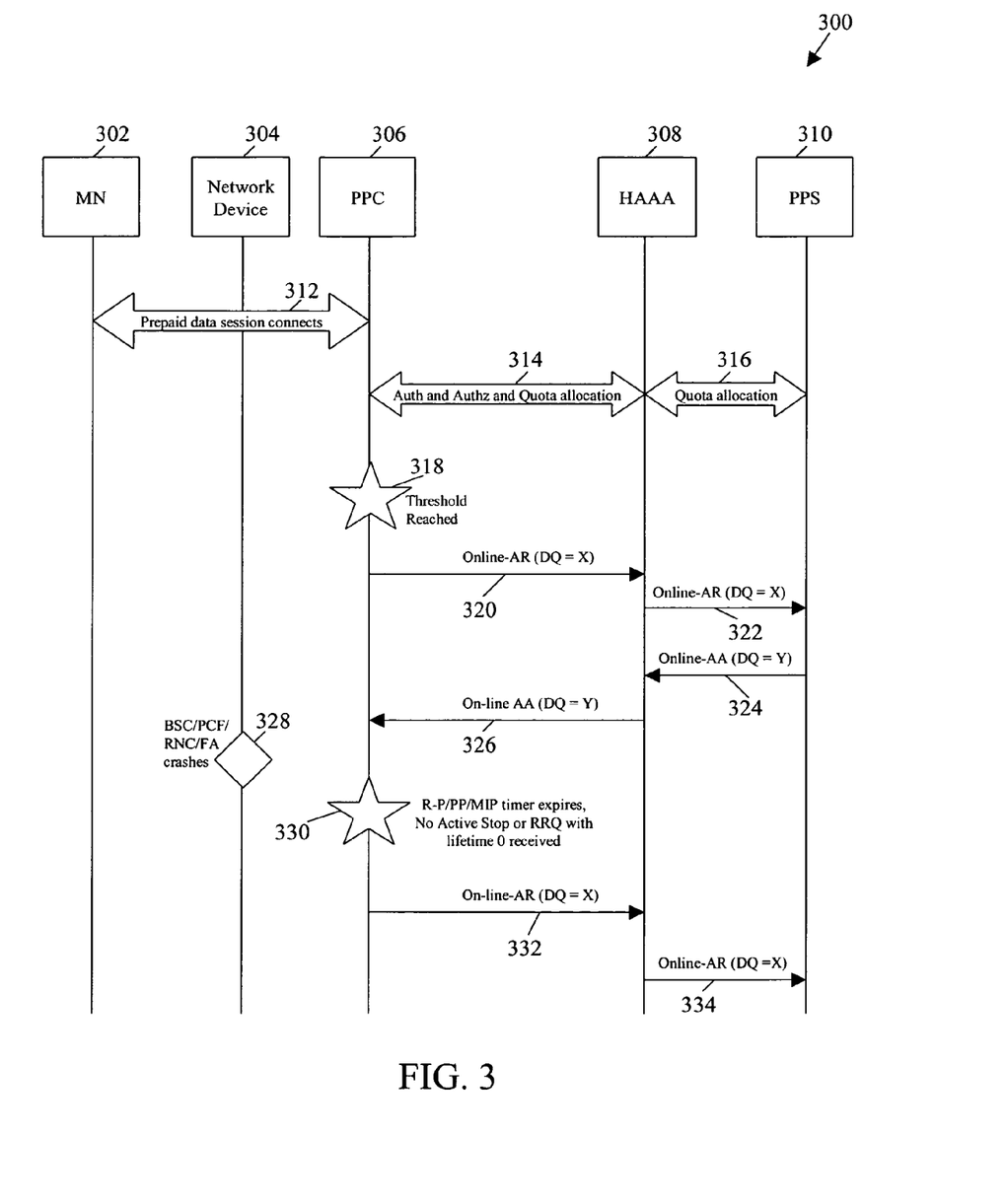
FIG. 3 is a schematic diagram of a process for determining usage until the last point at which user activity was not detected in accordance with certain embodiments of the present invention.

FIG. 3 illustrates a process 300 for measuring duration usage as a last reported duration quota in accordance with certain embodiments of the present invention. In process 300, a mobile node 302, a network device 304, a PrePaid Client 306, a HAAA 308, and a PrePaid Server 310 interact to provide each other with information to compute the duration of a packet data session. In some embodiments, PrePaid Client 306 is implemented on a PDSN, a Home Agent, or a Foreign Agent. At step 312, mobile node 302 contacts PrePaid Client 306 through network device 304 to initiate a packet data session. Network device 304 may be implemented in a Base Station Controller (BSC), a Packet Control Function (PCF), a Radio Network Controller (RNC), a Foreign Agent (FA), a Home Agent (HA), a Packet Data Serving Node (PDSN), or any other network device with access to radio link times. To retrieve a quota allocation associated with mobile node 302, PrePaid Client 306 contacts HAAA 308 to authenticate and authorize mobile node 302 in step 314. HAAA 308 contacts PrePaid Server 310 to lookup the quota allocation associated with mobile node 302 in step 316. In step 318 PrePaid Client reaches a threshold that triggers a reporting of a duration quota (DQ). The threshold may be a predetermined time threshold based on length of inactivity of a user, or any other suitable metric. The threshold may also be triggered by events such as a hardware failure or a protocol timer expiring.

Once the threshold is reached, the duration quota may need to be calculated before it is reported. The duration quota (DQ) may be computed at PrePaid Client 306 using a last activity timestamp. The last activity timestamp can be obtained from network device 304 because this device can access radio link transmission times and determine when data packets are sent or received by mobile node 302. These radio link transmission times are sent to a PrePaid Client during the packet data session, which begins at step 312 and continues until the session disconnects. The session may disconnect for a number of reasons, such as a device failure, a prepaid quota is expended, or a user ends the session. The PrePaid Client keeps a tally of time left for the packet data session. Step 318 may occur upon the receipt of a packet data session update sent from a PDSN or HA (not shown) which includes information such as the timestamp of the last activity recorded. A packet data session update can be a session stop where the packet data session is terminated and the last activity timestamp is used to compute the duration quota. In some embodiments, step 318 may be triggered after one or more session updates from a PDSN or HA (not shown) or network device 304 when the last activity timestamp is greater than some predetermined value. The threshold of step 318 may also be in response to a periodic timer. In response to step 318, an account reporting (AR) message is sent from PrePaid Client 306 to HAAA 308 which contains the last reported duration quota. HAAA 308, in step 322, sends the account reporting message to PrePaid Server 310. The last reported duration quota contained in the account reporting message is calculated by subtracting the last activity timestamp from the packet data session start timestamp. The duration quota may be calculated in PrePaid Client 306 or any other suitable network device. Other information such as the subscriber's credentials (e.g., at least one of Network Access Identifier (NAI), username, password, and/or handset serial number) may be sent along the duration quota to identify which mobile node 302 the duration quota pertains for purposes of account charging.

As illustrated, PrePaid Server 310 sends an account acknowledgement (AA) to HAAA 308 in step 324 in response to the AR message of step 322. The account acknowledgement may contain a duration quota equal to the quota remaining for mobile node 302 which is denoted as Y in steps 324 and 326. Other information such as the subscriber's credentials may be sent in the account acknowledgement as well. In step 326, HAAA 308 sends the account acknowledgement to PrePaid client 306 which is monitoring the packet data session.

In step 328, network device 304 crashes and no last activity timestamp is detected. Because no threshold is reached, as in step 318, a Radio Access Network (RAN) to PDSN (R-P), a Point-to-Point Protocol (PPP), or MIP timer expires depending on the configuration of network device 304. Neither a session stop nor a Mobile IP (MIP) registration request with a lifetime of zero is received from network device 304 or a PDSN/HA (not shown) at step 330. The last reported duration quota, denoted as X in step 320, is reported as a final duration quota, again as X, in step 332 to HAAA 308. In step 334, HAAA 308 sends the final duration quota to PrePaid Server 310. This is done instead of reporting zero duration when no last user activity is detected. In certain embodiments, PrePaid Server 310 may close the quota allocation because it has received the final duration quota.

Figure 4:
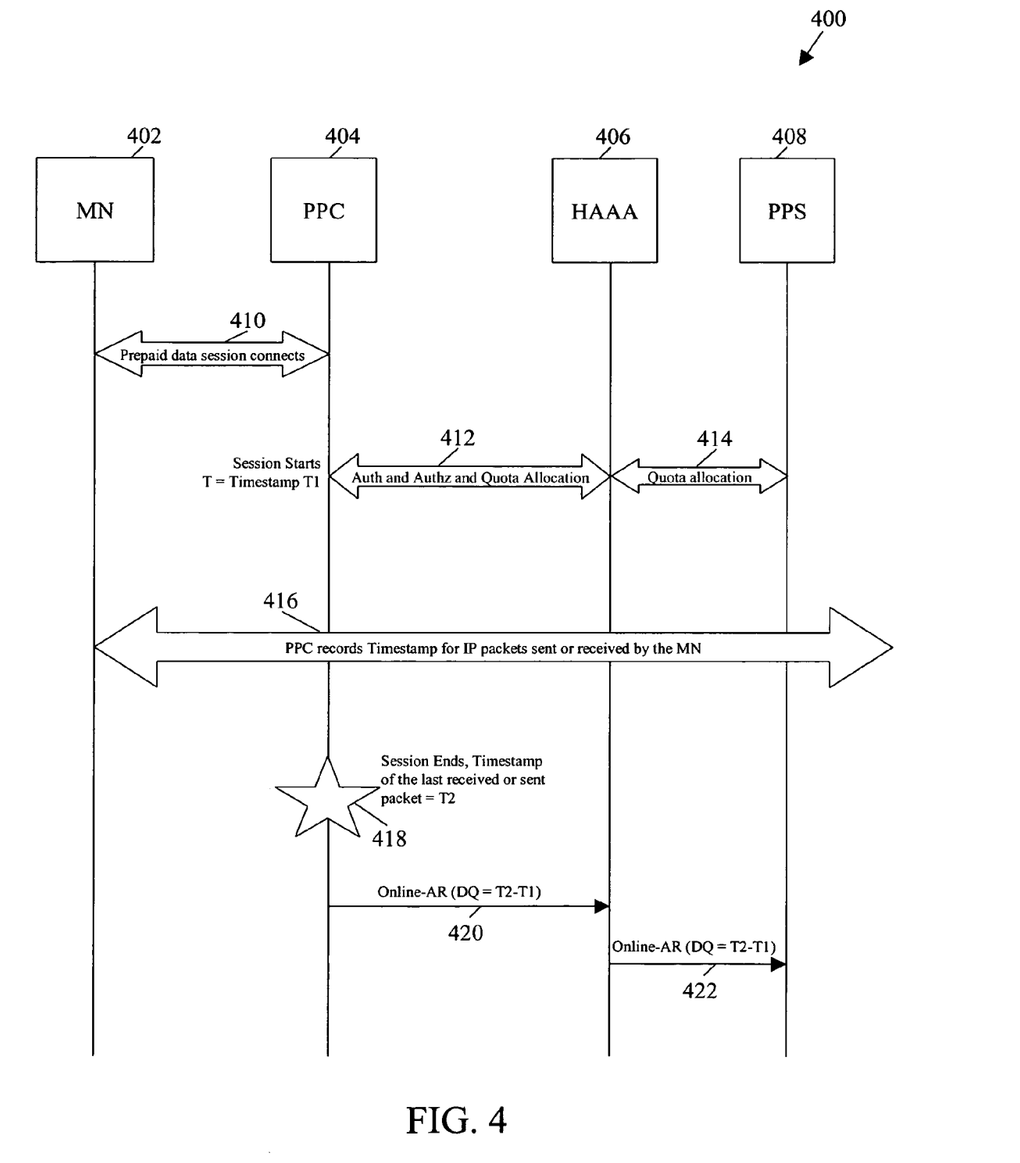
FIG. 4 is a schematic diagram of a process for determining usage based on specific types of activity in accordance with certain embodiments of the present invention.

FIG. 4 illustrates a network service usage technique 400 based upon layer-3 packet activity in accordance with certain embodiments of the present invention. Layer-3 is a routing layer of an open systems interconnection model and is the layer where packets can be routed based on IP or network addresses. The duration usage technique based on layer-3 uses information from the envelopes of the packets to compute the time and/or volume of usage of network services. An advantage of some embodiments of this technique is that the usage can be based on packet activity with the user.

As shown in technique 400, a Mobile Node 402, a PrePaid Client 404, a HAAA 406, and a PrePaid Server 408 interact to provide each other with information to compute the duration of a packet data session. In certain embodiments, PrePaid Client 404 is implemented on a PDSN, a Home Agent, or a Foreign Agent. At step 410, mobile node 402 connects to PrePaid Client 404 to initiate a packet data session. The connection between mobile node 402 and PrePaid Client 404 may include additional devices such as a base station, a PCF, a PDSN, or other networking devices, as one skilled in the art would appreciate. PrePaid Client 404 contacts HAAA 406 to authenticate and authorize mobile node 402 and to retrieve a quota allocation associated with mobile node 402 in step 412. At step 414, HAAA 406 contacts PrePaid Server 408 to lookup the quota allocation associated with mobile node 402. The presence of a quota allocation associated with mobile node 402 prompts a packet data session to begin with mobile node 402 and mobile node 402 can begin sending and receiving packet data to and from network 100 of FIG. 1. The start of the packet data session is marked by a timestamp that is denoted as T1 for purposes of illustration. This timestamp can be stored along with other session information in PrePaid Client 404, a PDSN, or a Home Agent (not shown). The timestamp may be extracted from the first packet in a packet data session or recorded from a timing mechanism.

After the packet data session starts, the last timestamp from IP packets sent or received by mobile node 402 is recorded. The timestamps may be placed in a cache, a buffer, a queue, random access memory or any other suitable memory storage device. In some embodiments, both control and data packets are considered user activity as long as the packets are sent or received by mobile node 402. In other embodiments, only data packets may be considered for determining user activity. In step 416, PrePaid Client 404 records a timestamp for packets sent or received by mobile node 402 during the packet data session. Depending on the configuration, the timestamp and possibly other packet header information may be stored in the memory device. In certain embodiments, more than one timestamp is stored and the timestamps are stored in a circular buffer that first fills the empty slots and then overwrites the older timestamps (the oldest timestamp T1 is not overwritten; it may be stored in another location or software is programmed not to overwrite it until the session ends).

The packet data session ends in step 418. The packet data session may end because the session times out, the user ends the call, or there is a system failure somewhere in the network. When such an event occurs, timestamp T2, which corresponds to the last packet sent or received by the mobile node, is retrieved. An online account report (AR) including a duration quota (DQ) that includes timestamps T1 and T2 is sent from PrePaid Client 404 to HAAA 406 in step 420. HAAA 406 forwards the online account report or portions of the account report to PrePaid Server 408. PrePaid Server 408 uses the duration quota to deduct from the quota allocation of mobile node 402.

In certain embodiments of the present invention, a PDSN such as PDSN 110, is used to detect and record packet activity to and from mobile node 402. If a packet has a destination or a source address that matches up with the registered IP address of mobile node 402 and is received at the PDSN, the PDSN records the time at which the packet is received. The recording of time at the PDSN can be done by copying the timestamp from the packet as it passes through the PDSN in route to its final destination. The IP address of mobile node 402 can be acquired during the setup of Internet Protocol Control Protocol (IPCP), which is a protocol responsible for configuring, enabling, and disabling the IP protocol on both ends of a point-to-point link (such as between PDSN routers). In other situations, the IP address of mobile node 402 can be obtained from a Mobile IP registration or by Dynamic Host Configuration Protocol (DHCP), which is a communications protocol that can manage and automate the assignment of Internet Protocol (IP) addresses in an organization's network. In certain embodiments, other routing addressing techniques may be used and other suitable methods for determining if the packet is bound for a particular mobile node can be used.

Based on the above-obtained timestamps, the duration of the packet data session can be computed by subtracting T2 (the timestamp of the last IP packet received or sent) from T1 (the timestamp from the session startup). In some embodiments, when the mobile node is dormant, IP packets destined to the mobile node may still be sent. These packets are recorded at the PDSN, PCF, RNC, BSC, or another layer-3 device such as a Home Agent, which may also complete the duration calculations. When the mobile node is unreachable, the Radio Access Network (RAN) tears down the connection at some point, which may be an A3, A8, or A10 interface connection. The A3, A8, and A10 interface connections are standard connections defined by the IS-2000 standard; and as one skilled in the art would appreciate other interface connections could be used with the present invention. After the connection is removed, the PDSN or other device can measure the duration of the packet data session based on the time the last packet destined for the user was received. If there is a successful Point-to-Point Protocol (PPP) renegotiation, the original packet data session is terminated and a new packet data session is established. The timestamp of the second packet data session setup (a second T1) is the time when successful PPP renegotiation was completed.

An advantage of the layer-3 techniques is that packets to or from the user are the ones considered to measure user activity. This is unlike methods where reception of any Mobile IP message is considered user activity, such as registration revocation, which is not initiated or received by the user.

The above technique can also be modified to charge users based on volume. Instead of recording a timestamp, the packet size in bytes or the number of packets can be recorded. In some embodiments, the size in bytes would be added to a running tally until the packet data session is terminated. The allocation quota is deducted according the cost of the number of bytes transmitted on the network or alternatively the number of packets. This embodiment may be desirable for charging users for downloading content to their mobile node such as movies, music, or web content. The number of packets sent and received by a mobile node may be a count of the packets in a packet data session, with each packet incrementing the count.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A method comprising:
    recording a first timestamp from a packet when a packet data session reflects user activity that is initiated by a user on a mobile node, the recording including causing a first timestamp to be recorded based on certain user activity and distinguishing control packets such that a timestamp is not recorded for at least some types of control packets;
    monitoring packets reflecting user activity sent or received by the mobile node after the first timestamp;
    recording a second timestamp based on an envelope of a packet sent or received by the mobile node;
    repeatedly updating the second timestamp based on an envelope of a subsequent packet reflecting subsequent user activity;
    determining a period of inactivity;
    triggering a reporting threshold based on time and/or volume responsive to the determination of a period of inactivity; and
    reporting to a server a user data session duration based on a time from the first timestamp to the second timestamp, such that the time does not include time after the second timestamp indicating a subsequent packet reflecting subsequent user activity;
    wherein a mobile user can be charged only for data usage consisting of packets reflecting user activity and not for at least some types of control packets.

2. The method of claim 1, wherein the monitoring occurs at a packet data serving node.

3. The method of claim 1, wherein the recording occurs at a client.

4. The method of claim 3, wherein the client is implemented on one of a packet data serving node and a home agent.

5. The method of claim 3, wherein the client requests prepaid packet data services on behalf of the mobile node, and wherein the server controls prepaid packet data services provide to the mobile node.

6. The method of claim 1, further comprising determining user activity by determining that a message is not initiated or received by the user and therefore is not user activity.

7. The method of claim 1, further comprising overwriting the second timestamp in a memory buffer.

8. The method of claim 1, further comprising updating the second timestamp for successive packets received in the same session.

9. A system comprising:
    a mobile node;
    a client, in communication with the mobile node, that is operable to:
        determine which data packets reflect user activity;
        record a first timestamp when a packet data session reflecting user activity is sent;
        repeatedly update a second timestamp to determine usage from subsequent envelopes of user data packets, and not for at least some types of control packets, sent or received by the mobile node during a packet data session;
        determine a period of inactivity;
        trigger a reporting threshold based on time and/or volume responsive to the determination of the period of inactivity; and
        report to a server a user data session duration based on a time from the first timestamp to the second timestamp, such that the time does not include time after the second timestamp indicating a subsequent packet reflecting subsequent user activity;
    an Authentication, Authorization, and Accounting (AAA) server in communication with the client that is operable to authenticate the mobile node and authorize the packet data session; and
    a server, in communication with the AAA server, operable to store account information associated with the mobile node,
    wherein a mobile user can be charged only for data usage consisting of packets reflecting user activity and not for at least some types of control packets.

10. The system of claim 9, wherein the client sends a currently-known duration in an account reporting message to the server, wherein the duration is repeatedly calculated from the first timestamp when a prepaid session starts and the second timestamp based on the last packet sent or received from the mobile node before the prepaid session ends.

11. The system of claim 9, wherein the client is implemented on a packet data serving node.

12. The system of claim 9, wherein the client requests prepaid packet data services on behalf of the mobile node, and wherein the server controls prepaid packet data services provide to the mobile node.

13. The system of claim 9, wherein the client is operable to determine that a message is not initiated or received by the user and therefore is not user activity.

14. A system comprising:
    a mobile node;
    client means for repeatedly recording prepaid information coupled to the mobile node that records at least a first and a second timestamp to determine usage from envelopes of data packets sent or received by the mobile means during a packet data session, and for triggering a reporting threshold based on time and/or volume responsive to a period of inactivity, and for reporting to a server a user data session duration based on a time from the first timestamp to the second timestamp, such that the time does not include time after the second timestamp indicating a subsequent packet reflecting subsequent user activity;
    determining means for repeatedly determining if a packet in the packet data session reflects user activity that is initiated by a user on the mobile means, wherein at least some types of control packets will be determined to not reflect user activity, and for determining the period of inactivity;
    means for authentication, authorization, and accounting in communication with the client means that authenticates the mobile means and authorizes the packet data session; and
    means for storing account information associated with the mobile means, in communication with the means for authentication, authorization, and accounting,
    wherein a mobile user can be charged only for data usage consisting of packets reflecting user activity and not for at least some types of control packets.

15. The system of claim 14, wherein the client means sends a duration in an account reporting message to the means for storing the prepaid account information that is calculated from the first timestamp when the prepaid session starts and the second timestamp which is the last packet sent or received by the mobile means before the prepaid session ends.

16. The system of claim 14, wherein the determining means is operable to determine that a message is not initiated or received by the user and therefore is not user activity.

17. A method comprising:

recording a first timestamp in a client when a packet data session reflects user activity that is initiated by a user on a mobile node, and not recording the first timestamp for at least some types of control packets;

repeatedly recording a current timestamp in the client when a packet data session ceases to reflect user activity based on an envelope of a subsequent packet sent or received by the user, and not recording the current timestamp for at least some types of control packets;

determining a period of inactivity;

triggering a reporting threshold based on time and/or volume responsive to the determination of a period of inactivity; and reporting a duration reflecting user activity based on the first timestamp and the current timestamp to a server, such that the duration does not include time after the current timestamp indicating a subsequent packet reflecting subsequent user activity, wherein a mobile user can be charged only for data usage consisting of packets reflecting user activity and not for at least some types of control packets.

18. The method of claim 17, wherein the first timestamp is based on a time when a session starts on one of a packet data serving node and a home agent, and the current timestamp is when the session ends on one of a packet data serving node and a home agent.

19. The method of claim 17, wherein the client requests prepaid packet data services on behalf of the mobile node, and wherein the server controls prepaid packet data services provide to the mobile node.

20. A method, comprising:

monitoring a packet data session with a mobile node at a network device;

determining from an envelope of a packet in a packet data session if the packet reflects user activity that is initiated by a user on the mobile node;

recording a first timestamp from the envelope of the packet associated with user activity at a client;

repeatedly recording a current timestamp from an envelope of a final packet associated with user activity at the client;

determining a period of inactivity;

triggering a reporting threshold based on time and/or volume responsive to the determination of a period of inactivity; and when the packet data session ends with the mobile node, reporting the duration from the first timestamp to the current timestamp to a server to measure user activity in a packet data session, such that the duration does not include time after the current timestamp indicating a subsequent packet reflecting subsequent user activity, wherein a mobile user can be charged only for data usage consisting of packets reflecting user activity and not for at least some types of control packets.

21. The method of claim 20, wherein determining user activity includes determining that a message is not initiated or received by the user and therefore is not user activity.

22. The method of claim 20, wherein the client requests prepaid packet data services on behalf of the mobile node, and the server controls prepaid packet data services provided to the mobile node.

23. The method of claim 20, wherein the duration is used for measuring and charging for packet service usage initiated by the user.

\* \* \* \* \*